(12) United States Patent
Chételat

(10) Patent No.: US 8,164,294 B2
(45) Date of Patent: Apr. 24, 2012

(54) TORQUER APPARATUS

(75) Inventor: Olivier Chételat, Hauterive (CH)

(73) Assignee: CSEM Centre Suisse d'Electronique et de Microtechnique S.A.

( * ) Notice: Subject to any disclaimer, the term of this patent is extended or adjusted under 35 U.S.C. 154(b) by 454 days.

(21) Appl. No.: 12/296,096

(22) PCT Filed: Mar. 28, 2007

(86) PCT No.: PCT/IB2007/000897
§ 371 (c)(1),
(2), (4) Date: Apr. 2, 2009

(87) PCT Pub. No.: WO2007/113666
PCT Pub. Date: Oct. 11, 2007

(65) Prior Publication Data
US 2010/0007303 A1    Jan. 14, 2010

(30) Foreign Application Priority Data

Apr. 5, 2006  (GB) .................................. 0606885.2

(51) Int. Cl.
*H02K 41/03* (2006.01)
*G01C 19/30* (2006.01)
*B64G 1/28* (2006.01)
(52) U.S. Cl. ....... 318/689; 310/90.5; 310/181; 310/231; 74/5.47
(58) Field of Classification Search .................. 318/689, 318/560, 568.11, 568.21, 647; 310/156.01, 310/195, 90.5, 162, 231, 261.1, 181, 179; 74/5.4, 5 R, 5.47, 5.7, 479.01; 244/165, 244/79; 250/231.12

See application file for complete search history.

(56) References Cited

U.S. PATENT DOCUMENTS

| | | | | |
|---|---|---|---|---|
| 3,741,500 A | * | 6/1973 | Liden | 244/165 |
| 4,019,392 A | * | 4/1977 | Zamfirescu | 74/5 R |
| 4,074,580 A | * | 2/1978 | Boltinghouse et al. | 74/5.6 D |
| 4,238,905 A | * | 12/1980 | MacGraw, II | 446/92 |
| 4,611,863 A | | 9/1986 | Isely | |
| 4,961,352 A | | 10/1990 | Downer et al. | |

(Continued)

OTHER PUBLICATIONS

Author: Lee, K.-M., Vachtseranos, G.; Kwan, C.Title: "Development of a Spherical Stepper Wrist Motor" Apr. 1988; Georgia Institute of Technology, Atlanta, GA 30332 pp. 267-272.*

(Continued)

*Primary Examiner* — Eduardo Colon-Santana
(74) *Attorney, Agent, or Firm* — Fish & Richardson P.C.

(57) ABSTRACT

In general, one aspect of the subject matter described in this specification features a torquer apparatus that includes a rotor with magnetic poles such that, when radially projected on a concentric octahedron, the same symmetrical pattern is obtained on all faces of the octahedron, the polarity of the poles projected on two adjacent faces of the octahedron being opposite. A stator with at least twenty poles magnetized with coils and such that, when radially projected on a concentric icosahedron, the same symmetrical pattern is obtained on all faces of the icosahedron, the stator being-in nominal position-concentric with the rotor. Real-time measurements, or equivalent information, of the position of the rotor with respect to the stator, and real-time measurements, or equivalent information, of exported torque from the stator, or of the orientation of the rotor with respect to the stator can be obtained. A controller for controlling the current in the coils based on the measurements, or the equivalent information, such that the rotor is magnetically held in the nominal position, and that the desired torque is exported.

16 Claims, 13 Drawing Sheets

Outline of rotor contained in stator with neighbor poles magnetically connected

U.S. PATENT DOCUMENTS

| | | | | |
|---|---|---|---|---|
| 5,237,229 A | * | 8/1993 | Ohishi | 310/90.5 |
| 5,353,656 A | * | 10/1994 | Hawkey et al. | 74/5.41 |
| 5,410,232 A | | 4/1995 | Lee | |
| 5,476,018 A | | 12/1995 | Nakanishi et al. | |
| 5,517,083 A | * | 5/1996 | Whitlock | 315/111.71 |
| 5,798,590 A | | 8/1998 | Sakakibara | |
| 6,305,647 B1 | * | 10/2001 | Defendini et al. | 244/165 |
| 6,349,124 B1 | * | 2/2002 | Kronenberg et al. | 376/147 |
| 6,834,561 B2 | * | 12/2004 | Meffe | 74/5.46 |
| 7,710,337 B2 | * | 5/2010 | Blalock | 343/757 |
| 2004/0035229 A1 | * | 2/2004 | Meffe | 74/5.6 A |
| 2009/0230787 A1 | * | 9/2009 | Won et al. | 310/38 |
| 2009/0315795 A1 | * | 12/2009 | Blalock | 343/763 |
| 2010/0258321 A1 | * | 10/2010 | Igarashi et al. | 166/381 |
| 2010/0320330 A1 | * | 12/2010 | McMickell et al. | 244/165 |

OTHER PUBLICATIONS

Author: Yano, T.Title: "Basic Characteristic of a hexahedron-Octahedron based spherical stepping motor" Jun. 2010 SPEEDAM 2010 International Symposium on Power Electronics, Electrical Drives, Automation and Motion; pp. 1748-1753.*

Author: Yano, T.;Title: "Proposal of Polyhedron based spherical stepping motor" Jun. 2008 SPEEDAM 2008 International Symposium on Power Electronics, Electrical Drives, Automation and Motion pp. 1433-1438.*

Chirikjian, et al., "Kinematic Design and Commutation of a Spherical Stepper Motor", *IEEE/ASME Transactions on Mechatronics*, 4(4):342-353, Dec. 1999.

* cited by examiner

Figure 1: Octahedron

Figure 2: Examples of pattern of rotor poles when projected on octahedron face

Figure 3: Polarity zones of rotor poles (black is north and white is south)

Figure 4: Outline of rotor with neighbor poles magnetically connected

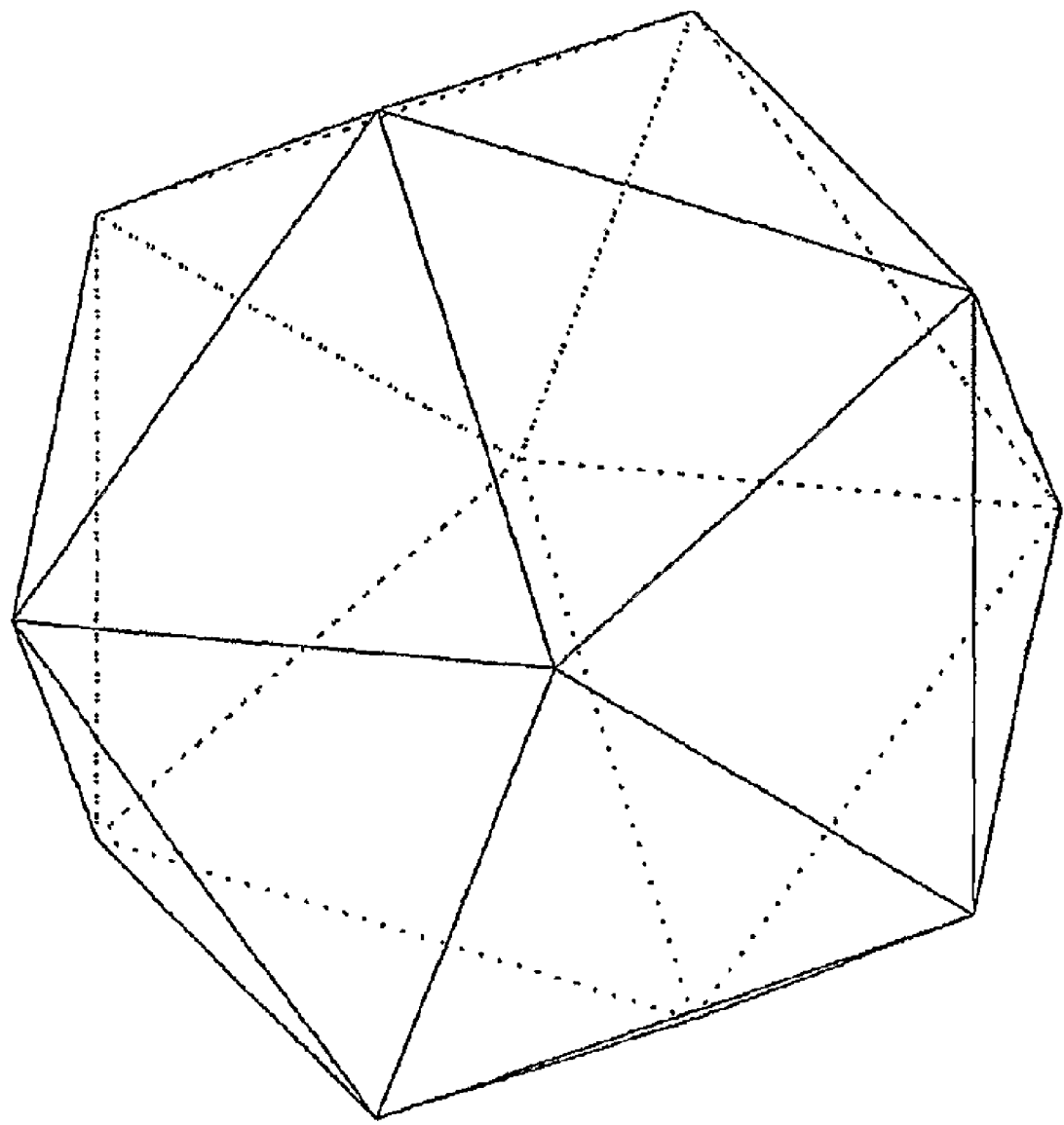
Figure 6: Icosahedron

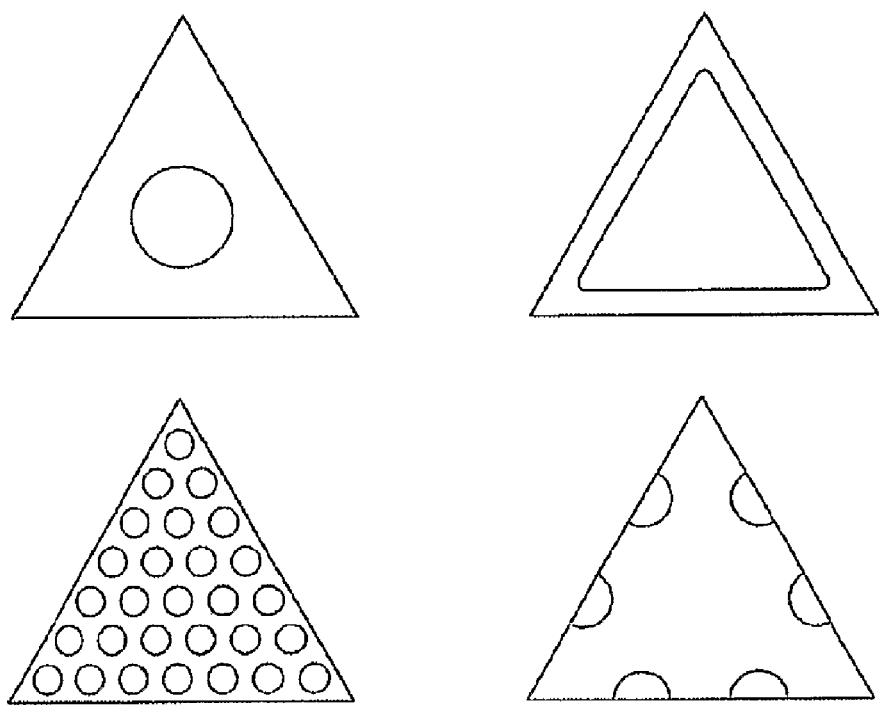
Figure 7: Examples of pattern of stator poles when projected on icosahedron face

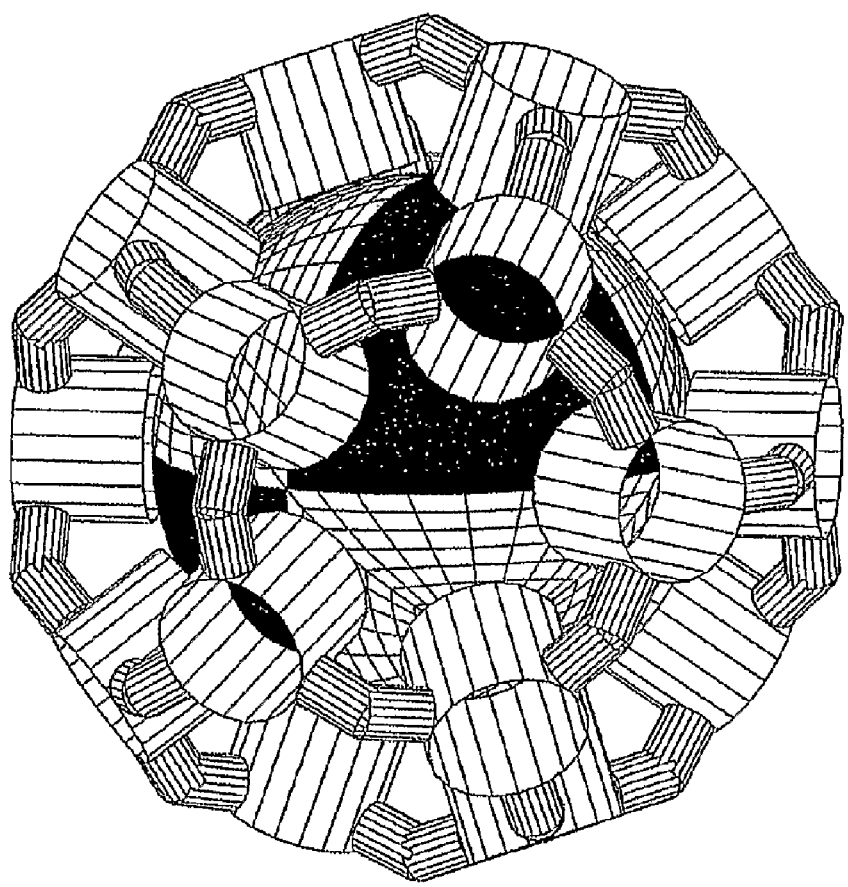
Figure 8: Outline of rotor contained in stator with neighbor poles magnetically connected

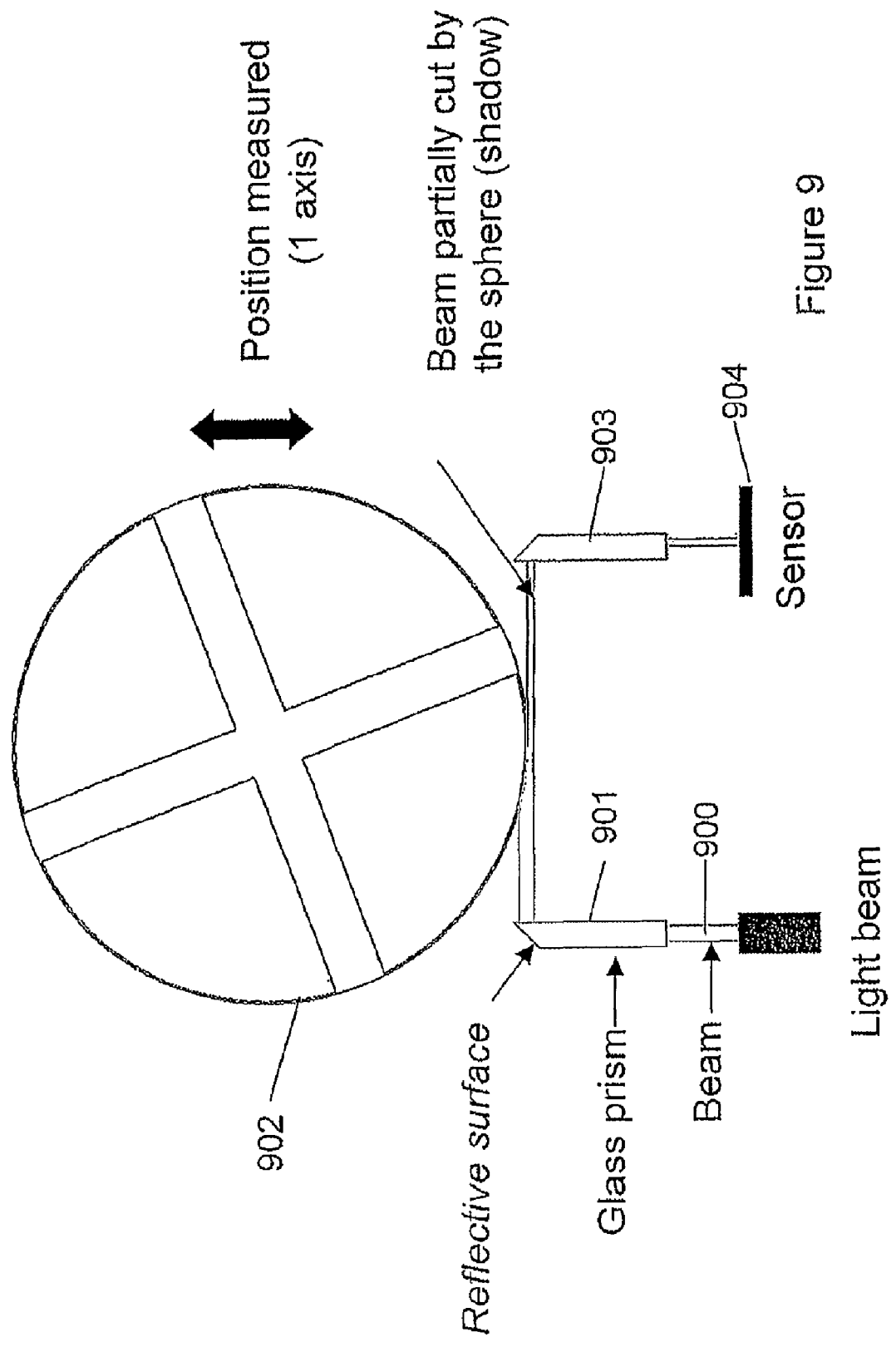

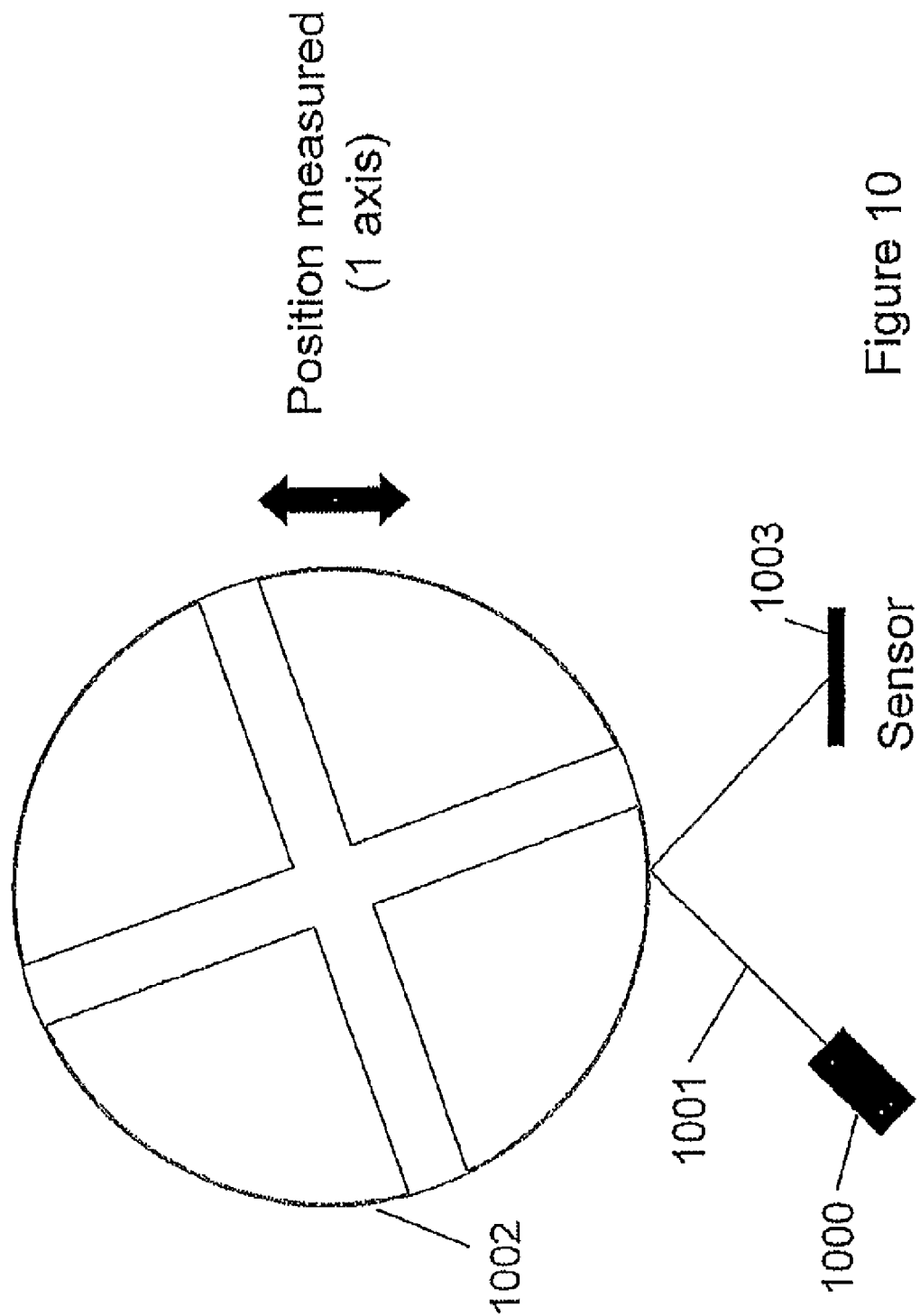

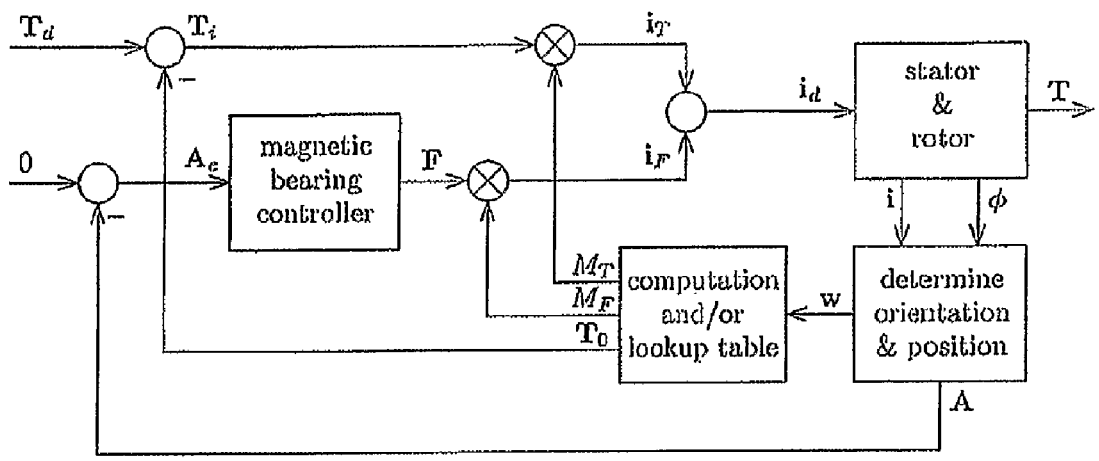

Figure 11: Controller diagram based on current and flux measurements

A     rotor position
    $A_e$   error signal of rotor position
    F     force applied on rotor
    $\phi$    measured fluxes at stator poles
    i     coil currents
    $i_F$   coil currents responsible for the force
    $i_T$   coil currents responsible for the torque
    $i_d$   desired coil currents
    $M_T$  matrix for torque coil currents from electro-magnetic torque
    $M_F$  matrix for force coil currents from desired force
    T     torque applied on rotor
    $T_0$   reluctant torque
    $T_d$   desired torque
    $T_i$   electro-magnetic torque
    w     equivalent information to rotor orientation

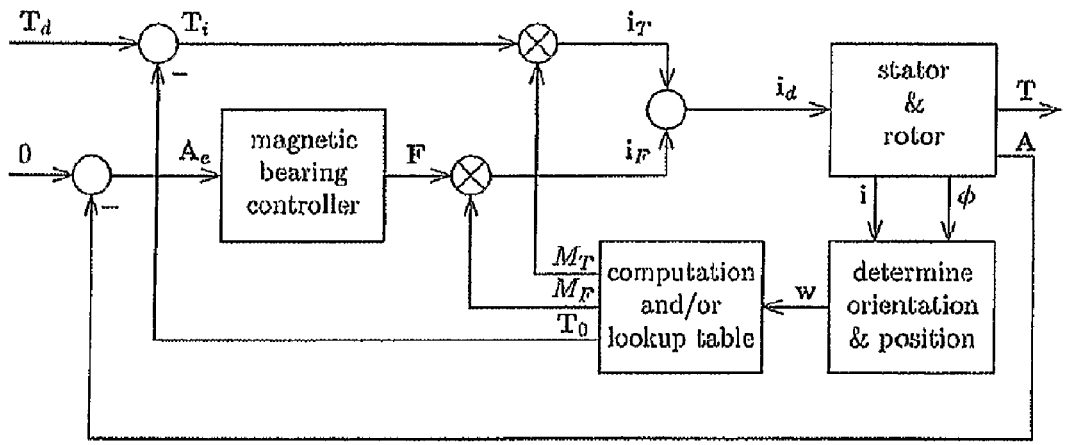

Figure 12: Controller diagram based on current, flux, and position measurements

| | |
|---|---|
| A | rotor position |
| $A_e$ | error signal of rotor position |
| F | force applied on rotor |
| $\phi$ | measured fluxes at stator poles |
| i | coil currents |
| $i_F$ | coil currents responsible for the force |
| $i_T$ | coil currents responsible for the torque |
| $i_d$ | desired coil currents |
| $M_T$ | matrix for torque coil currents from electro-magnetic torque |
| $M_F$ | matrix for force coil currents from desired force |
| T | torque applied on rotor |
| $T_0$ | reluctant torque |
| $T_d$ | desired torque |
| $T_i$ | electro-magnetic torque |
| w | equivalent information to rotor orientation |

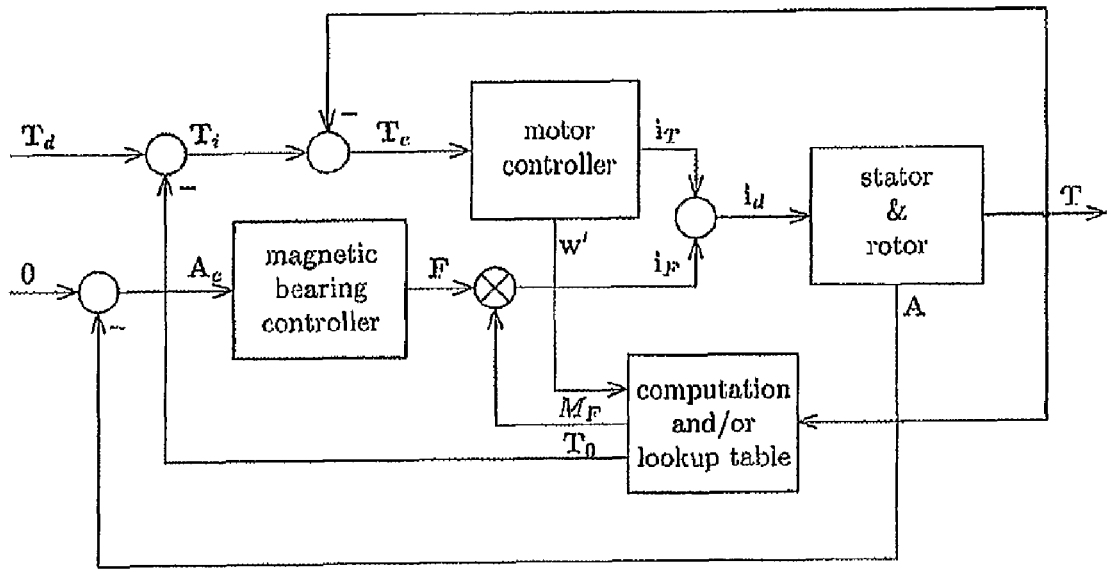

Figure 13: Controller diagram based on torque and position measurements

A    rotor position
    $A_e$    error signal of rotor position
    F    force applied on rotor
    $i_F$    coil currents responsible for the force
    $i_T$    coil currents responsible for the torque
    $i_d$    desired coil currents
    $M_F$    matrix for force coil currents from desired force
    T    torque applied on rotor
    $T_0$    reluctant torque
    $T_d$    desired torque
    $T_e$    error signal of torque
    $T_i$    electro-magnetic torque
    w'    equivalent information to orientation of rotating field

TORQUER APPARATUS

CROSS-REFERENCE TO RELATED APPLICATIONS

This application claims priority to foreign Patent Application No. 0606885.2, entitled TORQUER APPARATUS, to Olivier Chetelat, which was filed on Apr. 5, 2006, and PCT Application No. PCT/IB2007/000897, entitled TORQUER APPARATUS, to Olivier Chetelat, which was filed on Mar. 28, 2007. The disclosure of the above applications are incorporated herein by reference in their entirety.

BACKGROUND

The invention relates to torquer apparatus.

An accepted way to control the attitude of a vehicle in space is the use of reaction wheels or control moment gyroscopes. Reaction-gyro spheres have also been proposed (see, for instance, U.S. Pat. No. 4,611,863), but are not available as commercial products.

The three approaches are based on the principle that the total momentum of a cluster of mobile bodies is constant when no external torque is applied. Thus, a change of the momentum of one body, e.g., a wheel or a sphere, implies an opposite change of the momentum of the other bodies, e.g., the vehicle. As the momentum is the product of the moment of inertia with the angular velocity, a change of momentum results in a change of angular velocity. The attitude of the vehicle can therefore be controlled using these approaches, despite changes of momentum caused by moving parts of instruments, and despite external torques, caused, for example, by the Earth's magnetic field or the solar light pressure. In some situations, the external torques may eventually significantly alter the total momentum, forcing the wheels or the sphere to spin at their maximum angular velocity. External forces applied, for example, by thrusters are then used for 'de-saturation', bringing back the total momentum to an acceptable value.

Reaction wheels are wheels with controlled angular velocities. Usually three or more wheels are used with their axes spanning a 3D space. The wheel axes are fixed to the vehicle. Therefore, for a constant angular velocity of the vehicle, these axes change their orientation and, for the total momentum vector to remain constant in magnitude and direction, the wheels must continuously exchange their momentum.

Control moment gyroscopes are rapidly spinning wheels mounted on actuated gimbals. To change the angular velocity of the vehicle, the spin axis has to be tilted (remember that the total momentum is constant) by applying torques on the actuated joints of the gimbals. For a constant angular velocity of the vehicle, the joints of the gimbals are not actuated (assuming that the mass of the gimbals is negligible). Some rotations are impossible with a single control moment gyroscope.

The ultimate mechanism for controlling the vehicle momentum is a sphere—or at least a body with sufficient symmetries to have a scalar moment of inertia—with means to actuate the rotation of the sphere about any axis. Such a sphere replaces three or more reaction wheels and does not need to internally exchange momentum. Unlike control moment gyroscopes, a sphere does not have to, but can also, spin. Moreover, any rotation is possible with a single sphere, and any rotation sees similar conditions (isotropy).

The bearing of the sphere could be gimbals. In this case, if they are actuated, and if the sphere initially spins, the system is a control moment gyroscope. The joints of the gimbals can also be free with the sphere actuated by means of a pseudo-spherical motor such as disclosed in U.S. Pat. No. 5,476,018 (the motor described in this patent is here qualified as 'pseudo-spherical' because the binding of the sphere with the gimbals introduces poles, i.e., singularities that break the spherical symmetry).

Alternatively, the bearing of the sphere can be a reluctant magnetic bearing such as disclosed in U.S. Pat. Nos. 4,611, 863 or 4,961,352. In this case, as there is no contact with the sphere, to be actuated, the sphere has to become the rotor of a 3D motor. No contact with the sphere is advantageous, because it means lower vibrations, higher reliability, and longer lifetime. Three orthogonal pairs of arced linear inductive motors (U.S. Pat. No. 4,611,863) or three orthogonal pairs of ring inductive motors (U.S. Pat. No. 4,961,352) are used to control the bearing and the rotation of the rotor. Even though elegant, such motors are unfortunately highly inefficient, which is a problem of important concern in space. The principle of inductive motor is to drag the rotor thanks to a moving field exerting a 'magnetic friction'. As a consequence, the magnetic friction checks any motions of the rotor that are not following the direction of the moving field. In other words, the rotation created by one pair of inductive motors is checked by the two other pairs, dissipating thermal energy in the rotor.

Therefore, there is a need for an efficient reaction-gyro sphere with magnetic bearing.

SUMMARY

In one aspect the invention provides a torquer apparatus comprising:
  a) a rotor with magnetic poles such that, when radially projected on a concentric octahedron, the same symmetrical pattern is obtained on all faces of said octahedron, the polarity of the poles projected on two adjacent faces of said octahedron being opposite;
  b) a stator with at least twenty poles magnetized with coils and such that, when radially projected on a concentric icosahedron, the same symmetrical pattern is obtained on all faces of said icosahedron, said stator being-in nominal position-concentric with said rotor;
  c) means for obtaining real-time measurements, or equivalent information, of the position of the rotor with respect to the stator;
  d) means for obtaining real-time measurements, or equivalent information, of exported torque from the stator, or of the orientation of the rotor with respect to the stator;
  e) a controller for controlling the current in said coils based on said measurements, or said equivalent information, such that the rotor is magnetically held in said nominal position, and that the desired torque is exported.

The invention allows the construction of an efficient reaction-gyro sphere with magnetic bearing. Any rotation is possible at any time and the rotor is perfectly isotropic regarding its dynamic properties. One reaction-gyro sphere is enough to control the attitude of a vehicle. In addition, as the rotor has a constant source of magnetic field, on the one hand, the system is linear, allowing the decoupling of the motor and bearing functions by simple superposition, and on the other hand, the efficiency is potentially excellent with even the possibility to recover the kinetic energy stored in the rotor.

The rotor may be contained in the stator or, in an alternative construction the stator may be contained in the rotor.

Information specifying the rotor orientation may be obtained from the stator coil currents and stator pole fluxes.

Alternatively, or in addition, the rotor geometric external shape may be spherical and made of opaque materials, the rotor position with respect to the stator being measured with optical position sensors. In which case the position sensors may measure the distance between the rotor and the stator by measuring the shadow made by the rotor. Alternatively the position sensors may measure the distance between the stator and the rotor by detecting reflection from the rotor.

The position sensors may be placed orthogonally between pairs of adjacent stator poles. This enables the position of the rotor to be obtained in three dimensions.

In a second aspect the invention provides a torquer apparatus which generally comprises a reaction-gyro sphere consisting of a concentric assembly of a substantially spherical rotor and a substantially spherical stator. This is implemented in the present invention as a rotor with magnetic poles such that, when radially projected on a concentric octahedron, the same symmetrical pattern is obtained on all faces of said octahedron, the polarity of the poles projected on two adjacent faces bf said octahedron being opposite and a stator with at least twenty poles magnetized with coils and such that, when radially projected on a concentric icosahedron, the same symmetrical pattern is obtained on all faces of said icosahedron, said stator being-in nominal position-concentric with said rotor. Real-time measurements, or equivalent information, of the position of the rotor with respect to the stator are obtained together with exported torque from the stator, or the orientation of the rotor with respect to the stator. A controller controls the current in the coils of the stator poles based on said measurements, or said equivalent information, such that the rotor is magnetically held in said nominal position, and that the desired torque is exported.

BRIEF DESCRIPTION OF THE DRAWINGS

FIG. 6 illustrates an example for the distribution of poles of a stator distributed according to the faces of an icosahedron.

FIG. 7 illustrates examples of patterns of stator poles when projected on a face of an icosahedron.

FIG. 8 is an example for a schematic perspective view of a rotor contained in a stator having poles arranged according to the faces of an icosahedron, in which neighbouring poles are magnetically connected.

FIG. 9 illustrates an example of an optical sensor for sensing rotor position.

FIG. 10 illustrates another example of an optical sensor for sensing rotor position.

FIG. 11 is a block diagram illustrating an example implementation of a controller for a torquer apparatus.

FIG. 12 is a block diagram illustrating a second example of a controller for a torquer apparatus.

FIG. 13 is a block diagram illustrating a third example of a controller for a torquer apparatus.

Like reference numbers and designations in the various drawings indicate like elements.

DETAILED DESCRIPTION

The reaction-gyro sphere may consist of a nominally concentric assembly of an essentially spherical rotor and an essentially spherical stator. As far as the dynamic is concerned, the stator may actually be part of the vehicle body. The apparatus is also called a torquer, since its function is to export torque to the vehicle. As a reaction to the exported torque, the vehicle momentum is changed and the attitude eventually controlled.

For a large vehicle, the rotor is usually contained in the stator. To increase the rotor moment of inertia without increasing weight, the rotor can be made hollow. For a small vehicle, like an agile satellite, the opposite arrangement may be considered, i.e., with the stator (and the vehicle) contained in the rotor. In this case, the rotor may have to be designed such as to show large open portions, so as not to disturb significantly the satellite functions requiring access to the external space.

Figure 1:
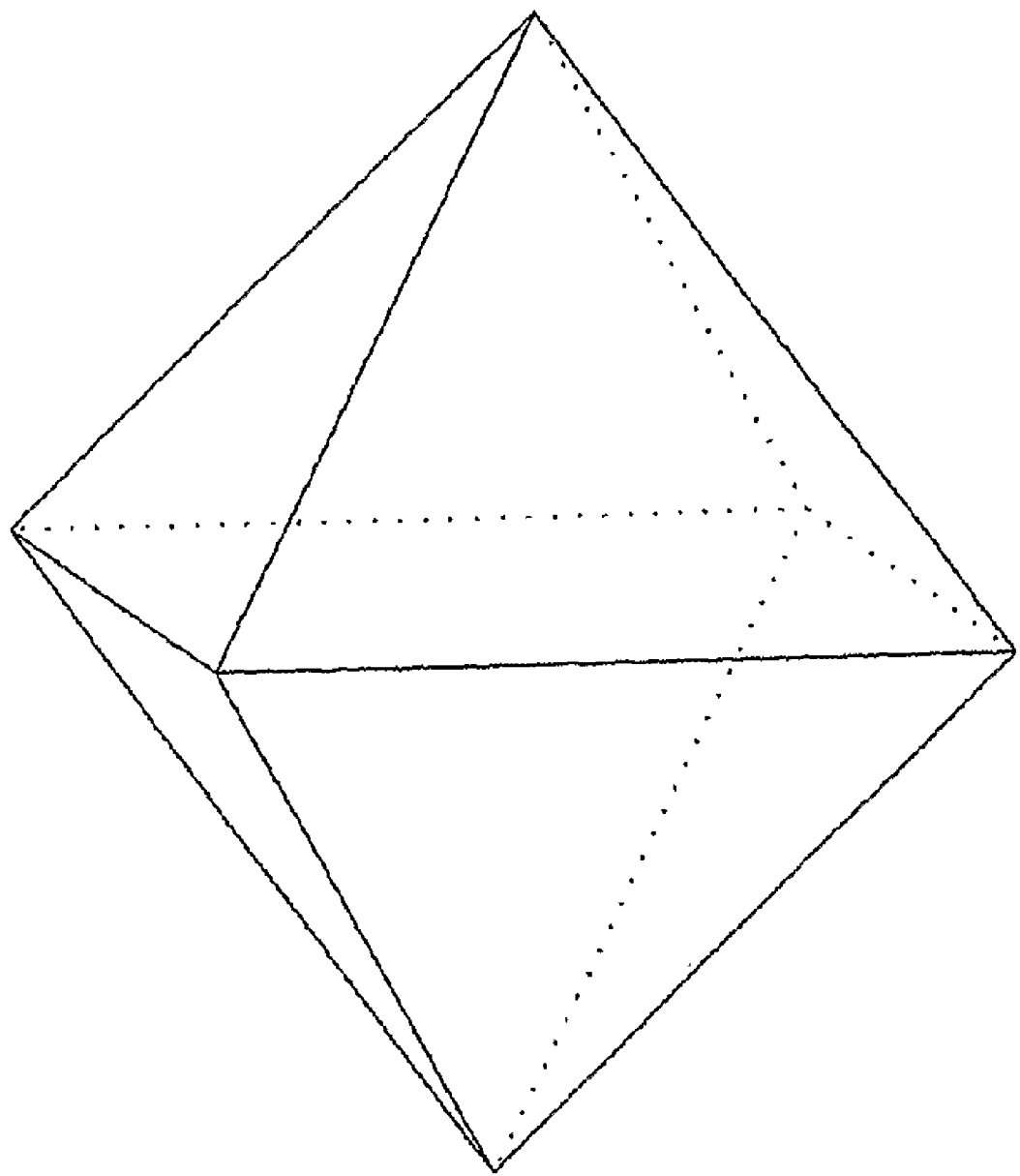
FIG. 1 illustrates an example for the distribution of poles of a rotor distributed according to the faces of an octahedron.
Figure 2:
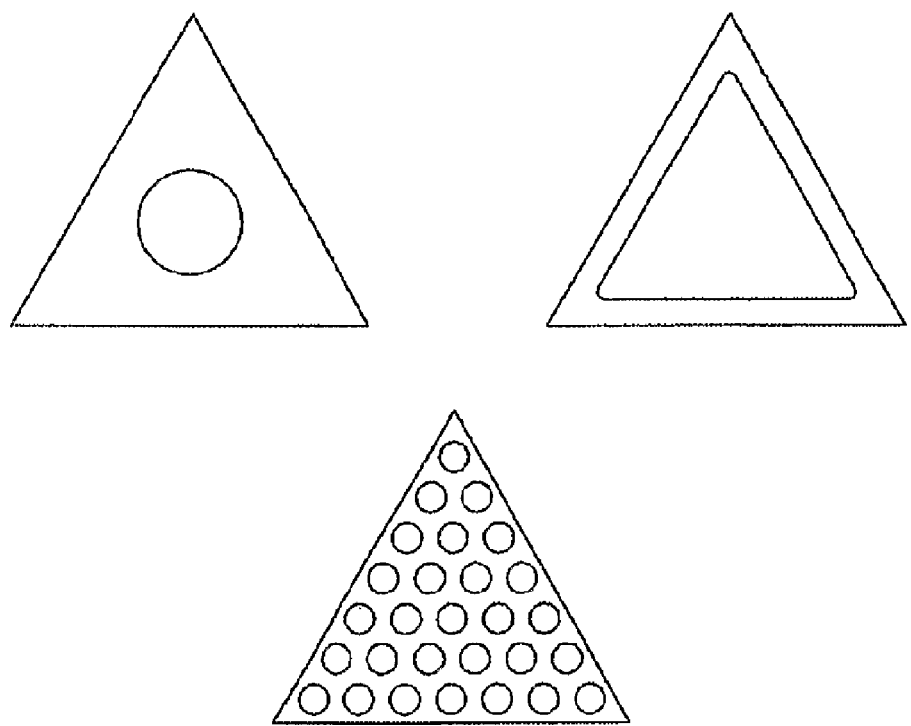
FIG. 2 illustrates examples of patterns of rotor poles when projected on a face of an octahedron.
Figure 3:
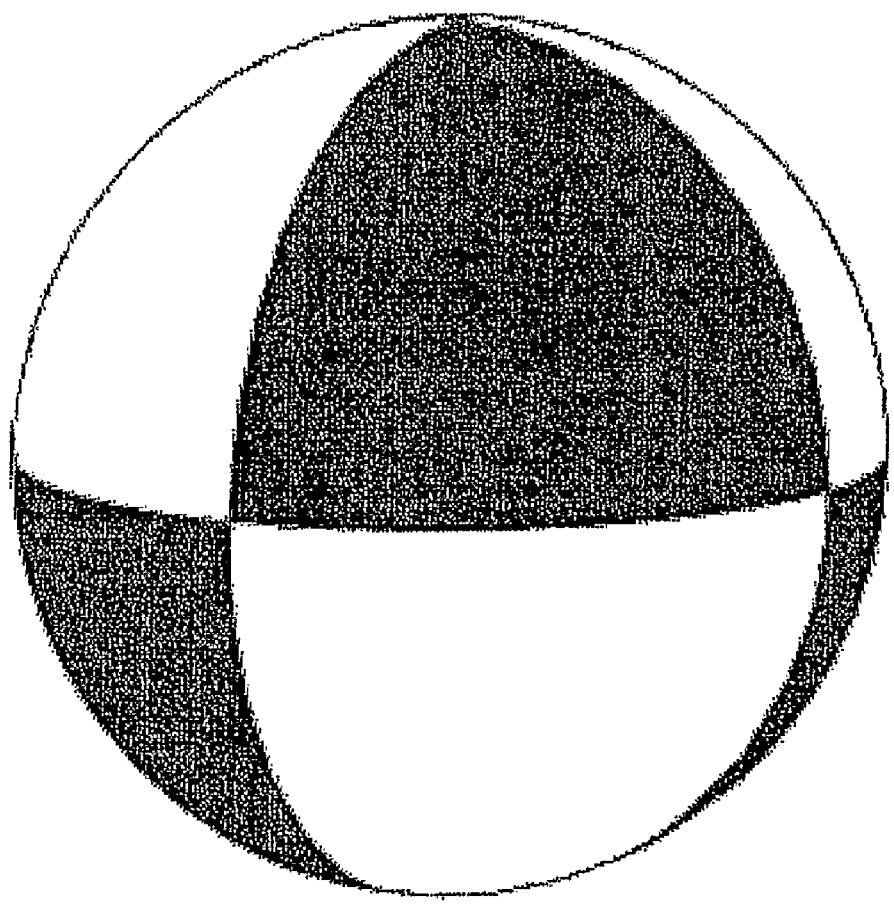
FIG. 3 illustrates an example for magnetic polarity zones of rotor poles, having opposite polarity on adjacent faces of an octahedron.

As opposed to U.S. Pat. No. 5,798,590 patent, the rotor of the invention has magnetic poles. Moreover, in order to allow north and south poles to harmoniously coexist in a regular pattern, the poles are distributed according to the faces of an octahedron (see FIG. 1). In principle, any distribution of poles with a symmetric pattern of their radial projection on a concentric octahedron is acceptable (symmetric in this context means invariant by rotation of 120° about the middle point of the octahedron face). The same holds for the shape of the poles. Usually, there is only one pole per octahedron face and, to keep the symmetry, the pole must be centred as shown in FIG. 2. In this case, the number of poles is eight. More poles can be considered, as long as their projected pattern is symmetric. However, they must have the same polarity within a given face of the octahedron. Two adjacent faces of the octahedron must have opposite polarity as illustrated in FIG. 3. This constraint does not allow poles to be shared by two octahedron faces, i.e., split by the octahedron edges or centred on the octahedron corners.

Figure 4:
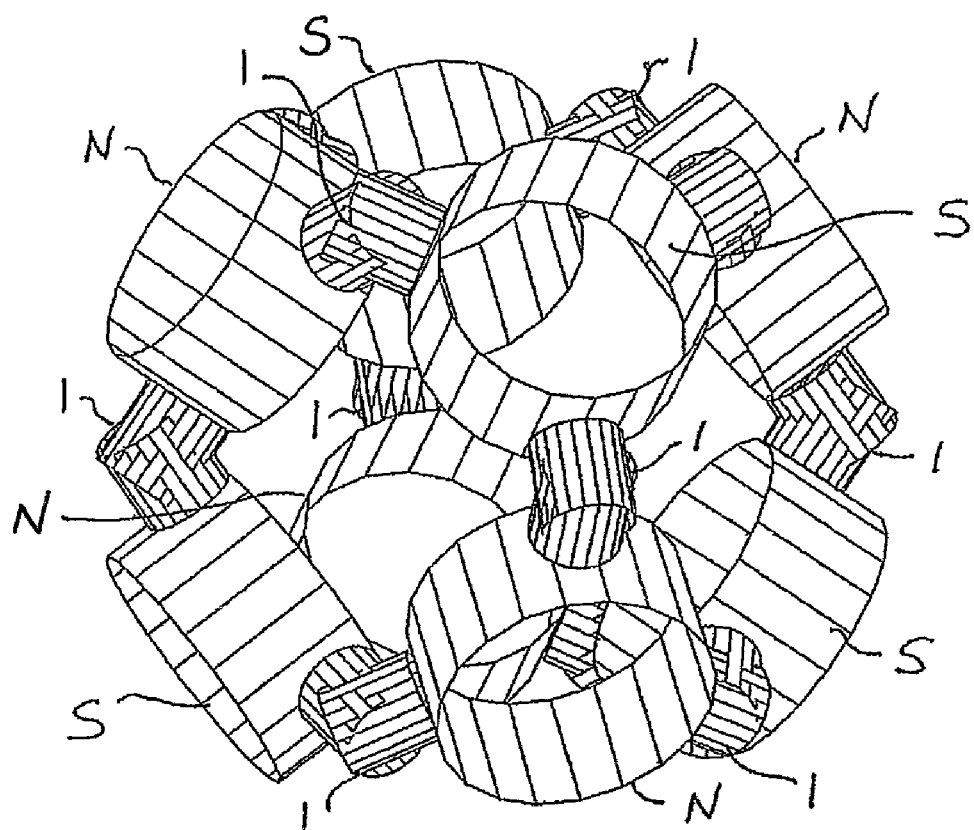
FIG. 4 is an example for a schematic perspective view of a rotor having poles arranged according to the faces of an octahedron, in which neighbouring poles are magnetically connected.

Generally, the rotor poles N and S are magnetically connected by connection pieces 1 to their neighbours as shown, for example, in FIG. 4, but the connection may be absent in some cases. The type of connection can also be different. For example, one embodiment could be a core, possibly hollow, that simultaneously connects all poles together.

Figure 5:
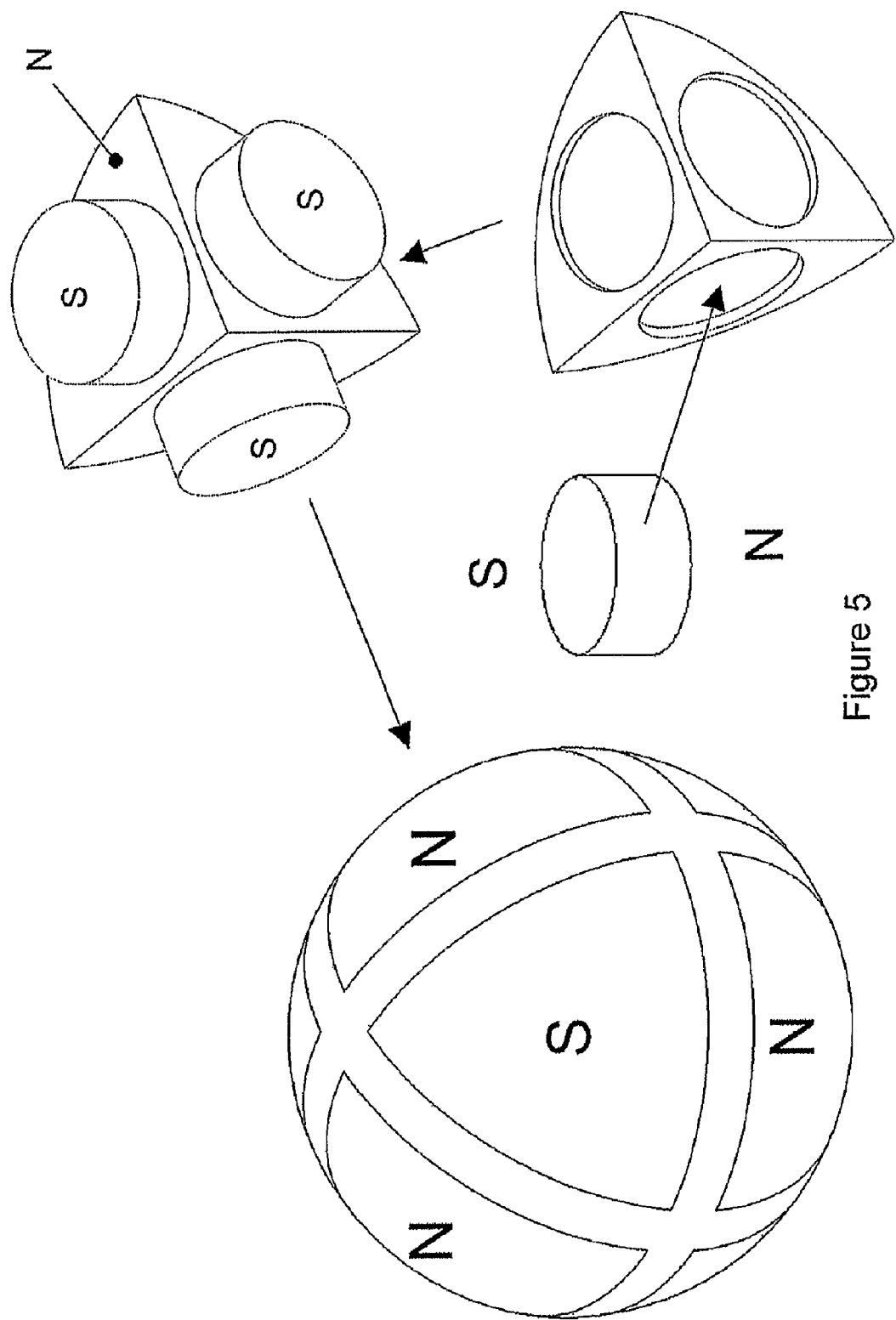
FIG. 5 illustrates an example of a rotor, in which permanent magnets link neighbouring poles of the rotor.

FIG. 5 shows a possible embodiment of the rotor, where the source of magnetic field is produced by twelve permanent magnets placed in each neighbour connection. Note that other possibilities would have been for instance to use eight permanent magnets placed right at the poles, or both, i.e., twenty permanent magnets. Instead of permanent magnets, another common source of magnetic field that could be used is coils powered by a constant current (i.e., electro-magnets). Yet another possibility would be to have the complete rotor magnetized. In this case, the rotor could be just a ball, possibly hollow, of permanent magnet material magnetized according to the pattern of, for example, FIG. 3.

The distribution and the shape of the stator poles is based on an icosahedron as shown in FIG. 6. In the same manner as for the rotor, their radial projection on the icosahedron faces must form a symmetric pattern that must be the same for all faces. As opposed to the rotor, however, the poles can be half on one face and half on the adjacent face as shown in FIG. 7. Some can also be at the icosahedron corners. The stator must have at least twenty poles. Therefore, a solution with poles only at the corners (i.e. twelve poles) is not acceptable.

FIG. 8 shows a possible stator embodiment outline with magnetic connection between neighbour poles and containing the rotor. As for the rotor, the magnetic connection may be different from that shown in FIG. 8, or even absent.

The stator poles are magnetized by controlled coil currents. Usually, there is a coil per pole, but the coils can also be placed at the connection between neighbour poles.

FIG. 9 shows the principle of a possible optical sensor of the rotor position based on the rotor shadow. A light beam 900 (for example, from a collimated laser) is reflected by a prism 901 (or mirror) such that the beam is partially closed on one side by the rotor 902 and on the other side by a light stop fixed to the stator. The beam is then reflected by a further prism 903 (or mirror) and impinges on a sensor 904. The amount of light sensed by the sensor 904 gives a proportional measure of the distance between rotor and stator.

As the rotor position must be measured in three dimensions (3D), at least three 1D position sensors are required. They can be placed orthogonally thanks to a convenient feature of the icosahedron that it has sets of orthogonal edges. Therefore, the position is preferably measured between two adjacent poles, the three axes being orthogonal one from each other.

Another example of an optical position sensor is based on the position measurement of a position on the rotor when the incident beam reaches the rotor with an angle.

As shown in FIG. 10 a light source 1000 produces a collimated beam 1001 which is incident on the rotor 1002 at a given angle and is then reflected from the rotor 1002 onto a sensor 1003. As the position of the rotor 1002 changes the position on the sensor 1003 where the reflected beam impinges will vary and consequently the position of the rotor 1002 can be calculated from the response of the sensor 1003. This, of course, requires the surface of the rotor to be reflective where the light beam impinges on it. As with the arrangement of FIG. 9 three such sensors are required arranged orthogonally in order to determine the rotor position in three dimensions.

The rotor position can also be obtained from the measurement of the coil currents and of the stator pole fluxes. A knowledge of the coil currents allows the sensor to compensate for the flux made by the coil, and to extract the flux caused by the rotor only. When the rotor is centred, all compensated fluxes are equal taking into account the stator orientation. When the rotor is shifted, the change in the flux distribution indicates the magnitude and direction of the displacement. For optical measurements, the outer surface of the rotor must be optically homogenous and spherical. This is not required for the position computed from currents and fluxes.

The measurement of the coil currents and of the stator pole fluxes can also be used for the computation of the rotor orientation. As for the rotor position, the first step is to extract the flux caused by the rotor only. Then, as antipodean rotor poles have opposite polarity, only the difference of the extracted flux of opposed poles has to be considered as determinant for the orientation. Actually, thanks to the icosahedral symmetry of the stator and to the octahedral symmetry of the rotor, this difference can always be expressed in a linear basis of dimension four. Therefore, a four-component vector in this linear basis is sufficient to describe the rotor orientation. Moreover, the magnitude of the vector is not relevant and can be set arbitrarily to unity; three degrees of freedom are enough to describe any orientation within the octahedral symmetry.

The rotor orientation or equivalent information is important because the reluctant torque depends on the rotor orientation, and this torque may have to be compensated for by the controller to enhance the performances, especially regarding the exported torque noise. The reluctant torque can be obtained by computation or using a look-up table.

From the rotor orientation or equivalent information, two important matrices can also be obtained by computation or with a look-up table. The first one allows the computation of the coil currents responsible for the torque by usual matrix product with the desired electro-magnetic torque. From the other, the coil currents responsible for the force are computed via the matrix product on the desired force coming from the bearing controller. The full diagrams are shown in FIGS. 11 and 12.

A possible computation of the matrices $M_F$ and $M_T$ is based on the pseudo inversion of the matrices $K_F$ and $K_T$, i.e., $M_F = W K_F^T (K_F W K_F^T)^{-1}$, $MT = W K_T^T (K_T W K_T^T)^{-1}$, where W is an invertible matrix that can be chosen as the identity matrix; the matrices $K_F$ and $K_T$ are the force and torque factors—a multiplication with the current results in a force or a torque—and can be obtained from the electromechanical model. In general, $K_F$ and $K_T$ vary with the orientation w, and so do $M_F$ and $M_T$.

When the online computation of $M_F$ and $M_T$ is not possible, e.g. if not enough computing power is available, they can be obtained by look-up tables. As the rotor is of cubic symmetry, a simple transformation consisting in describing the orientation of a given pole in the positive (x>0, y>0, z>0) quarter, possibly with a sign inversion to take into account the polarity, is sufficient to unambiguously encode the orientation of the rotor. This orientation may be described by the three Euler angles. Therefore, every entry of matrices $M_F$ and $M_T$ is a 3-dimensional table. For given Euler angles, the value of a given entry is obtained by accessing the closest indexed value in the tables. A linear interpolation with the neighboured indexed values can reduce the size of the tables. The tables can be obtained by offline computation based on the model. They can also be obtained by a system identification or adaptive control techniques.

The magnetic bearing controller as shown in FIGS. 11 to 13 can be, for example, a simple PO, i.e. a controller made of a proportional gain plus a weighted derivative of the input signal. The desired value is normally constant (since one wants the rotor to be kept immobile). This constant is defined as the zero setting point (therefore, the 0 in FIGS. 11 to 13). In some applications where it is desirable that the rotor is not statically kept exactly in the centre of the stator (for example in order to absorb vibrations) the setting point may dynamically vary.

FIG. 13 shows an alternative controller based on the measurement of the exported torque instead of the rotor orientation. This has some advantages. First, even if the reluctant torque is not compensated, the closed loop can adjust the coil currents so as to get the desired torque. Second, the rotor orientation or equivalent information is no longer needed, since in this case, it is the deviation between the orientation of a rotating field of constant magnitude and the rotor orientation that produces the torque. Therefore, the torque measurements can also be used to estimate the rotor orientation or equivalent information. Note that an approximate estimate of the rotor orientation is sufficient for the magnetic bearing, because an error of rotor orientation results in an error of gain for the magnetic bearing loop. Moreover the magnetic bearing controller is generally robust enough to accept such incertitude.

The system can also be used for inertial navigation purposes, especially when the desired torque is set to zero with either the sphere spinning (gyro) or immobile (inertia). In this case, it is necessary that the system is provided with means to measure the absolute or relative orientation of the rotor. Such means can be patterns (set of markers) read, for instance, with an optical sensor. The patterns may have icosahedral, octahedral or tetrahedral symmetry, or may be simply random.

The invention claimed is:

1. A torquer apparatus comprising:
   a) a rotor with magnetic poles such that, when radially projected on a concentric octahedron, the same symmetrical pattern is obtained on all faces of said octahedron, the polarity of the poles projected on two adjacent faces of said octahedron being opposite;
   b) a stator with at least twenty poles magnetized with coils and such that, when radially projected on a concentric icosahedron, the same symmetrical pattern is obtained on all faces of said icosahedron, said stator being in nominal position concentric with said rotor;
   c) means for obtaining real-time measurements, or equivalent information, of the position of the rotor with respect to the stator;
   d) means for obtaining real-time measurements, or equivalent information, of exported torque from the stator, or of the orientation of the rotor with respect to the stator;
   e) a controller for controlling the current in said coils based on said measurements, or said equivalent information, such that the rotor is magnetically held in said nominal position, and that the desired torque is exported.

2. An apparatus according to claim 1 in which the rotor is contained in the stator.

3. An apparatus according to claim 2 in which there is a source or a distribution of sources of magnetic field at each rotor pole.

4. An apparatus according to claim 2 in which each rotor pole is magnetically connected to its neighbours.

5. An apparatus according to claim 4 in which there is a source or a distribution of sources of magnetic field at each connection between neighbour rotor poles.

6. An apparatus according to claim 2 in which each stator pole is magnetically connected to its neighbours.

7. An apparatus according to claim 2 in which information representing the rotor orientation is obtained from the stator coil currents and stator pole fluxes.

8. An apparatus according to claim 2 in which information representing the rotor position is obtained from the stator coil currents and stator pole fluxes.

9. An apparatus according to claim 2 in which the rotor geometric external shape is spherical and made of opaque materials, and in which the rotor position with respect to the stator is measured with optical position sensors.

10. An apparatus according to claim 9 in which the position sensors measure the distance between the rotor and the stator by measuring the shadow made by the rotor.

11. An apparatus according to claim 9 in which the position sensors measure the distance between the stator and the rotor by detecting reflection from the rotor.

12. An apparatus according to claim 9 in which the position sensors are placed orthogonally between pairs of adjacent stator poles.

13. An apparatus according to claim 2 in which the reluctant torque vector is obtained by interpolation from a multi-dimensional look up table addressed with the rotor orientation measurement or equivalent information.

14. An apparatus according to claim 2 in which the matrix allowing the computation of the force coil currents from the force desired by the magnetic bearing controller is totally or partially obtained by interpolation from a multi-dimensional look-up table addressed with the rotor orientation measurement or equivalent information.

15. An apparatus according to claim 2 in which the matrix allowing the computation of the torque coil currents from the desired torque, possibly compensated for by the reluctant torque, is totally or partially obtained by interpolation from a multi-dimensional look-up table addressed with the rotor orientation measurement or equivalent information.

16. An apparatus according to claim 1 in which the stator is contained in the rotor.

* * * * *